US008823858B2

(12) United States Patent
Ono (10) Patent No.: US 8,823,858 B2
(45) Date of Patent: Sep. 2, 2014

(54) IMAGING APPARATUS (71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/186,446

(22) Filed: Feb. 21, 2014

(65) Prior Publication Data

US 2014/0168498 A1  Jun. 19, 2014

Related U.S. Application Data (63) Continuation of application No. PCT/JP2012/066683, filed on Jun. 29, 2012.

(30) Foreign Application Priority Data

Aug. 24, 2011 (JP) .................................. 2011-183038

(51) Int. Cl.
H04N 5/225 (2006.01)

(52) U.S. Cl.
USPC ......................................................... 348/335

(58) Field of Classification Search
USPC ................. 348/335, 336, 369, 345, 349, 340, 348/222.1, 294, 308, 47; 375/240.12, 375/240.01; 359/619, 618, 621; 382/173; 396/332
See application file for complete search history.

(56) References Cited

U.S. PATENT DOCUMENTS

| 6,233,003 | B1 * | 5/2001 | Ono | 348/47 |
| 8,380,060 | B2 * | 2/2013 | Georgiev et al. | 396/332 |
| 8,605,197 | B2 * | 12/2013 | Ono | 348/340 |
| 8,605,198 | B2 * | 12/2013 | Ono | 348/340 |
| 2006/0023314 | A1 * | 2/2006 | Boettiger et al. | 359/621 |
| 2007/0121212 | A1 * | 5/2007 | Boettiger et al. | 359/619 |
| 2011/0085050 | A1 * | 4/2011 | Dowski et al. | 348/222.1 |
| 2011/0188570 | A1 * | 8/2011 | Matsuzaki | 375/240.12 |
| 2012/0327222 | A1 * | 12/2012 | Ng et al. | 348/135 |
| 2013/0120605 | A1 * | 5/2013 | Georgiev et al. | 348/222.1 |
| 2013/0222676 | A1 * | 8/2013 | Ono | 348/345 |
| 2013/0308197 | A1 * | 11/2013 | Duparre | 359/621 |

FOREIGN PATENT DOCUMENTS

| JP | 2002-191060 | 7/2002 |
| JP | 2003-098426 | 4/2003 |
| JP | 2006-324354 | 11/2006 |
| JP | 2007-306406 | 11/2007 |
| JP | 2007-317951 | 12/2007 |
| JP | 2009-157043 | 7/2009 |
| JP | 2009-162847 | 7/2009 |

OTHER PUBLICATIONS

International Search Report, PCT/JP2012/066683, Jul. 31, 2012.

* cited by examiner

Primary Examiner — Aung S Moe
(74) Attorney, Agent, or Firm — Young & Thompson (57) ABSTRACT An imaging apparatus includes an image generating unit obtaining a first imaging signal or a second imaging signal from a first light-receiving element group or a second light-receiving element group of an image pickup device, respectively and generating a first image or a second image, and the first light-receiving element group and the second light-receiving element group of the image pickup device are configured to obtain a first image and a second image with different weights according to a first characteristic and a second characteristic, respectively, of a photographing optical system.

14 Claims, 10 Drawing Sheets

IMAGING APPARATUS

CROSS REFERENCE TO RELATED APPLICATIONS

This application is a continuation of Application No. PCT/JP2012/066683 filed on Jun. 29, 2012, which claims foreign priority to Japanese Application No. 2011-183038 filed on Aug. 24, 2011. The entire contents of each of the above applications are hereby incorporated by reference.

BACKGROUND OF THE INVENTION

1. Field of the Invention

The presently disclosed subject matter relates to imaging apparatuses and, in particular, to an imaging apparatus capable of obtaining images of various characteristics.

2. Description of the Related Art

Japanese Patent Application Laid-Open No. 2003-098426 suggests a taking lens for a camera, the taking lens having a first lens unit with a predetermined spectral transmission characteristic and a second lens unit with a spectral transmission characteristic substantially different form the predetermined spectral transmission characteristic concentrically arranged, and the first lens unit and the second lens unit having different focal lengths. And, with a subject irradiated with illumination light having a spectral irradiance characteristic according to either one of the spectral transmission characteristics of the first lens unit and the second lens unit, the subject transmitted through the first lens unit or the second lens unit can be photographed.

Japanese Patent Application Laid-Open No. 2007-317951 suggests an image pickup device provided with a photo-detection element for use in pupil-division-type phase difference focus adjustment. Specifically, in a region for focus detection of the image pickup device, pixel pairs each with one microlens disposed for a plurality of pixels are regularly arranged, and out-of-focus can be detected based on a phase shift of images of the plurality of pixel pairs.

Also, Japanese Patent Application Laid-Open No. 2002-191060 suggests a three-dimensional imaging apparatus capable of finding distance information by using a correlational method by separating, into two according to an in-focus state, an image on a focus plane obtained by photographing distance information of the entire scene by a single-lens camera.

SUMMARY OF THE INVENTION

Japanese Patent Application Laid-Open No. 2003-098426 does not describe a technology of subjecting the light beam passing through the first lens unit and the light beam passing though the second lens unit to pupil division, letting each light beam enter a first pixel group and a second pixel group in one image pickup device, and reading from one image pickup device as a separate image.

On the other hand, in the invention described in Japanese Patent Application Laid-Open No. 2007-317951, separate images can be read from the plurality of pixel pairs, but these images are to detect a phase shift (focus shift) between images. Therefore, the pixel pairs, where a phase difference due to focus shift can be detected, are disposed only in a region where focusing is to be performed, and normal pixels are arranged in other regions.

Moreover, Japanese Patent Application Laid-Open No. 2002-191060 discloses an image pickup device capable of obtaining images subjected to pupil division in a lateral direction, respectively. Cells of this image pickup device are uniformly arranged on the entire surface of the image pickup device so as to allow left and right parallax images to be obtained.

Therefore, there is no motivation to combine the invention disclosed in Japanese Patent Application Laid-Open No. 2003-098426 with the technologies described in Japanese Patent Application Laid-Open No. 2007-317951 and Japanese Patent Application Laid-Open No. 2002-191060.

An object of the presently disclosed subject matter is to provide an imaging apparatus capable of obtaining an image corresponding to each characteristic of a photographing optical system having a plurality of characteristics as an image weighted according to each characteristic.

To achieve the object above, an imaging apparatus according to one embodiment of the presently disclosed subject matter is configured to include a photographing optical system having a first region with a first characteristic and a second region with a second characteristic different from the first characteristic; an image pickup device having a first light-receiving element group and a second light-receiving element group which are two-dimensionally arranged; optical elements provided correspondingly to the first light-receiving element group and the second light-receiving element group of the image pickup device, and letting only a light beam passing through the first region of the photographing optical system received by the first light-receiving element group and letting only a light beam passing through the second region of the photographing optical system received by the second light-receiving element group; and an image generating unit configured to obtain a first imaging signal or a second imaging signal from the first light-receiving element group or the second light-receiving element group of the image pickup device, respectively, and configured to generate a first image or a second image, respectively, wherein the first light-receiving element group and the second light-receiving element group of the image pickup device are configured to obtain the first image and the second image with different weights according to the first characteristic and the second characteristic, respectively, of the photographing optical system.

According to one embodiment of the presently disclosed subject matter, light beams passing through the first region and the second region of the photographing optical system with different characteristics are let enter the first light-receiving element group and the second light-receiving element group, respectively, of the image pickup device, and the first imaging signal and the second imaging signal are obtained from the first light-receiving element group and the second light-receiving element group to generate the first image and the second image, respectively. Thus, the first image and the second image corresponding to the first characteristic and the second characteristic, respectively, of the photographing optical system can be obtained. Also, the information obtaining capabilities the first light-receiving element group and the second light-receiving element group are weighted. With this, the first image and the second image weighted according to the first characteristic and the second characteristic, respectively, of the photographing optical system can be obtained.

In an imaging apparatus according to another embodiment of the presently disclosed subject matter, the first region and the second region of the photographing optical system are different from each other in at least one of a focal length, a transmission wavelength band, and a spatial frequency characteristic.

In an imaging apparatus according to still another embodiment of the presently disclosed subject matter, in the first light-receiving element group and the second light-receiving element group of the image pickup device, more light-receiving elements arranged correspondingly to a characteristic regarded as important between the first characteristic and the second characteristic of the photographing optical system are assigned than other light-receiving elements. With this, an image with a different image size can be obtained according to whether the image corresponds to the characteristic regarded as important.

In an imaging apparatus according to yet still another embodiment of the presently disclosed subject matter, preferably, the photographing optical system has the first characteristic for a general photographing distance and the second characteristic for macro photography, and a number of pixels of the first light-receiving element group of the image pickup device is larger than a number of pixels of the second light-receiving element group. With this, the image size of an image for general photographing distance can be made larger than the image size of a close-up image.

In an imaging apparatus according to yet still another embodiment of the presently disclosed subject matter, the first light-receiving element group and the second light-receiving element group of the image pickup device are configured so that an arrangement density of the first light-receiving element group and an arrangement density of the second light-receiving element group vary according to a position the image pickup device. With this, images with resolutions according to the first characteristic and the second characteristic of the photographing optical system can be obtained.

In an imaging apparatus according to yet still another embodiment of the presently disclosed subject matter, the photographing optical system has the first region which is in a circular shape centering on an optical axis of the photographing optical system and the second region which is in an annular shape. The first region has the first characteristic for a general photographing distance, and the second region has the second characteristic for macro photography. The arrangement density of the first light-receiving element group of the image pickup device is higher in a peripheral portion than in a center portion of the image pickup device, and the arrangement density of the second light-receiving element group is higher in the center portion than the peripheral portion of the image pickup device. In the close-up image, since the center portion of the image pickup device (photographing screen) is important, the resolution of that important portion can be increased. On the other hand, in the image for general distance, the resolution can be evenly kept over the entire image pickup device (photographing screen).

In an imaging apparatus according to yet still another embodiment of the presently disclosed subject matter, preferably, the photographing optical system has the first characteristic in which a focus is achieved on a far view and the second characteristic in which the focus is achieved on a near view, and the first light-receiving element group of the image pickup device has a density higher in a lower region than in a higher region of the image pickup device, and the second light-receiving element group of the image pickup device has a density higher in the higher region than in the lower region of the image pickup device. It is often the case that a far-view subject is present on an upper portion of the photographing screen (a lower portion of the image pickup device) and the near-view subject is present on a lower portion of the photographing screen (an upper portion of the image pickup device). Therefore, the density of the first light-receiving element group where the far-view subject is in focus and the density of the second light-receiving element group where the near-view subject is in focus are varied according to the position of the image pickup device in a vertical direction.

In an imaging apparatus according to yet still another embodiment of the presently disclosed subject matter, the first light-receiving element group and the second light-receiving element group of the image pickup device are configured to have different photographing sensitivities. With this, the sensitivity of the light-receiving element group corresponding to the characteristic requiring more light amount can be increased, and the sensitivity of the light-receiving element group corresponding to the characteristic not requiring much light amount can be set as normal sensitivity.

In an imaging apparatus according to yet still another embodiment of the presently disclosed subject matter, the first light-receiving element group and the second light-receiving element group of the image pickup device are configured to have different sizes of an aperture which light enters or different sizes of a microlens for letting light gathered to each light-receiving element.

In an imaging apparatus according to yet still another embodiment of the presently disclosed subject matter, preferably, the photographing optical system has the first region with the first characteristic for a general photographing distance and the second characteristic for macro photography, and the photographing sensitivity of the second light-receiving element group of the image pickup device is higher than the photographing sensitivity of the second light-receiving element group.

According to the presently disclosed subject matter, light beams passing through the first region and the second region of the photographing optical system with different characteristics are let enter the first light-receiving element group and the second light-receiving element group, respectively, of the image pickup device, and the first imaging signal or the second imaging signal are obtained from the first light-receiving element group and the second light-receiving element group to generate the first image or the second image, respectively. Thus, the first image and the second image corresponding to the first characteristic and the second characteristic, respectively, of the photographing optical system can be obtained. In particular, the information obtaining capabilities of the first light-receiving element group and the second light-receiving element group are weighted. Thus, the first image and the second image weighted according to the first characteristic and the second characteristic, respectively, of the photographing optical system can be obtained.

DETAILED DESCRIPTION OF EXEMPLARY EMBODIMENTS

Embodiments of the imaging apparatus according to the presently disclosed subject matter are described below according to the attached drawings.

<Imaging Apparatus>

Figure 1:
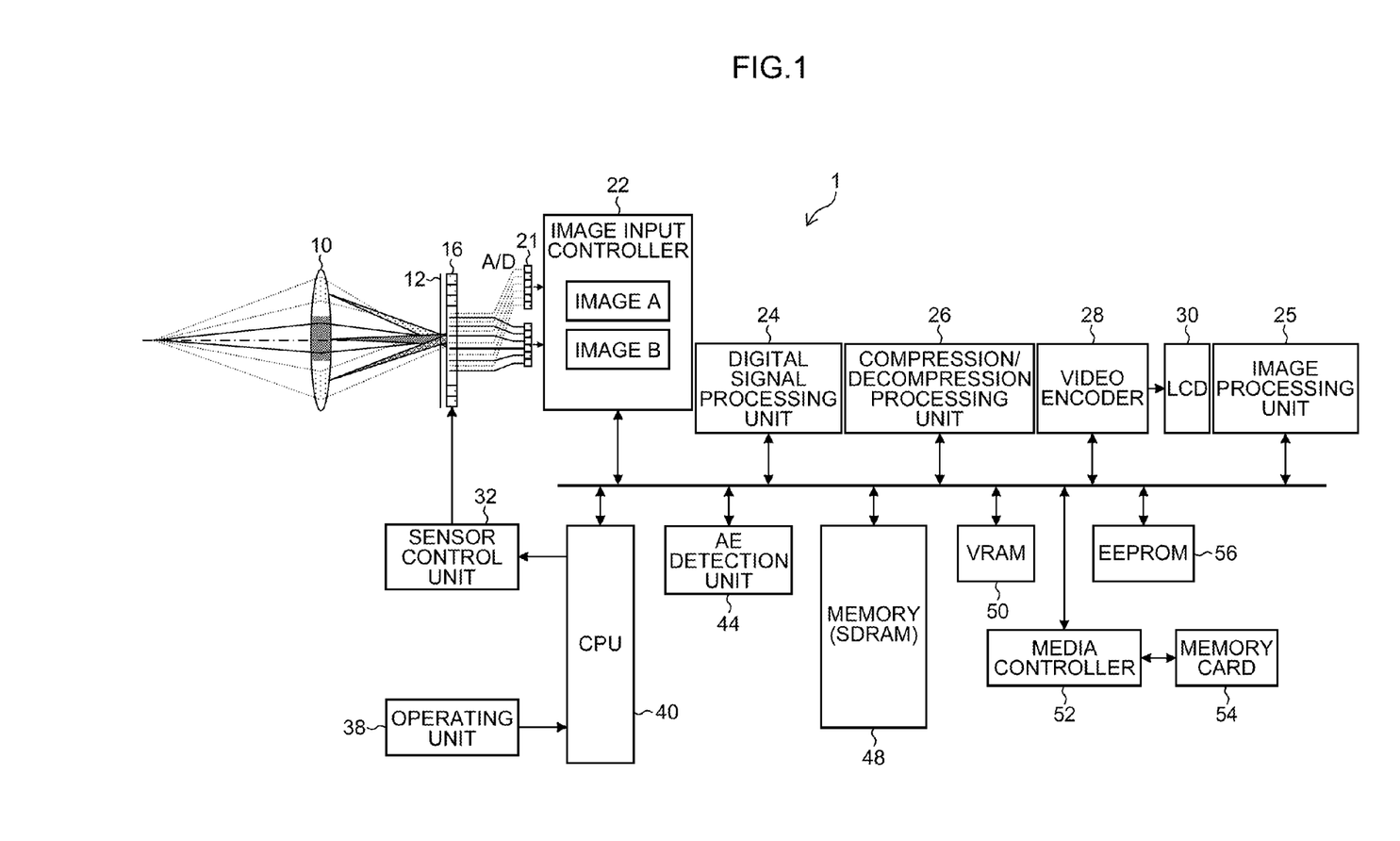
FIG. 1 is a block diagram of an embodiment of an entire structure of an imaging apparatus according to the presently disclosed subject matter.

FIG. 1 is a block diagram of an embodiment of an entire structure of an imaging apparatus according to the presently disclosed subject matter.

The imaging apparatus 1 records an imaged image in a memory card 54. The entire operation of the apparatus is controlled in a centralized manner by a Central Processing Unit (CPU) 40.

The imaging apparatus 1 is provided with an operating unit 38 including a shutter button, a mode dial, a reproduction button, a MENU/OK key, a cross key, and a BACK key. A signal from this operating unit 38 is inputted to the CPU 40, and the CPU 40 controls each circuit of the imaging apparatus 1 based on the input signal. For example, the CPU 40 performs lens drive control, diaphragm drive control, photographing operation control, image processing control, image data recording/reproduction control, display control of a liquid-crystal monitor (LCD (Liquid Crystal Display)) 30, and others.

The shutter button is an operation button for inputting an instruction for starting photographing, and is configured of a switch of a two-step stroke type having an S1 switch that is turned ON at the time of a half push and an S2 switch that is turned ON at the time of a full push. The mode dial is an operating member for selecting operation of selecting any of an auto photographing mode for photographing a still picture, a manual photographing mode, a scene position such as people, landscape, and nightscape, and a moving-picture mode for photographing moving picture.

The reproduction button is a button for switching to a reproduction mode for displaying the photographed and recorded still picture or moving picture on the liquid-crystal monitor 30. The MENU/OK key is an operation key having both of a function as a menu button for making an instruction for causing a menu to be displayed on the screen of the liquid-crystal monitor 30 and a function as an OK button for making an instruction for determining and executing a selected content. The cross key is an operating unit for inputting an instruction in four directions, that is, upward, downward, leftward, and rightward, and function as a button (cursor movement operation means) for selecting an item from the menu screen and making an instruction for selecting various setting items from each menu. Also, an up/down key of the cross key functions as a zoom switch at the time of photographing or a reproduction zoom switch in the reproduction mode. A left/right key functions as a frame advance (forward/backward advance) button in the reproduction mode. The BACK key is used when, for example, a desired target such as a selection item is deleted, an instruction content is cancelled, or the operation state is returned to an immediately previous state.

In a photographing mode, an image of subject light is formed on the light-receiving surface of an image pickup device 16 of a CMOS (Complementary Metal Oxide Semiconductor) type via a photographing optical system and an optical element 12 for providing pupil directivity.

The photographing optical system includes a taking lens 10, a diaphragm, a filter, and others. In FIG. 1, only the taking lens 10 is depicted among the components of the photographing optical system.

Figure 2A:
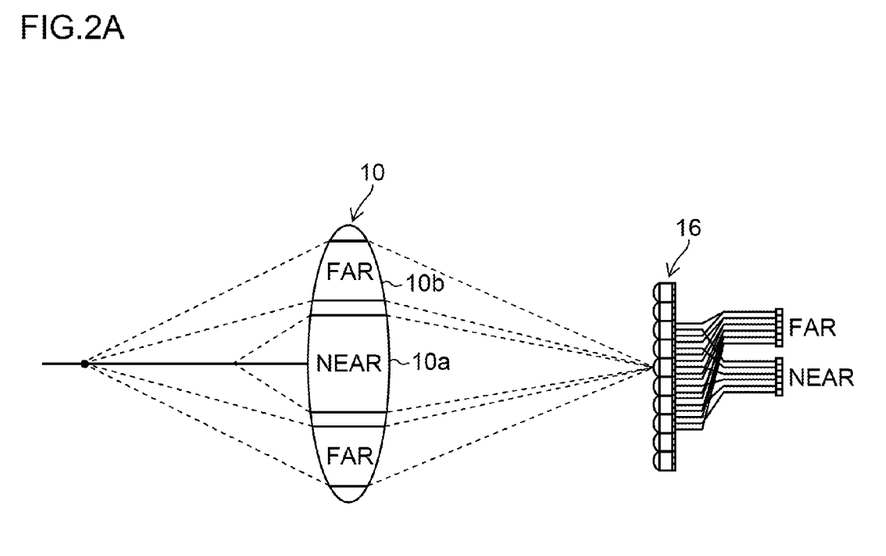
FIG. 2A is a diagram of a relation between a taking lens and an image pickup device depicted in FIG. 1.
Figure 2B:
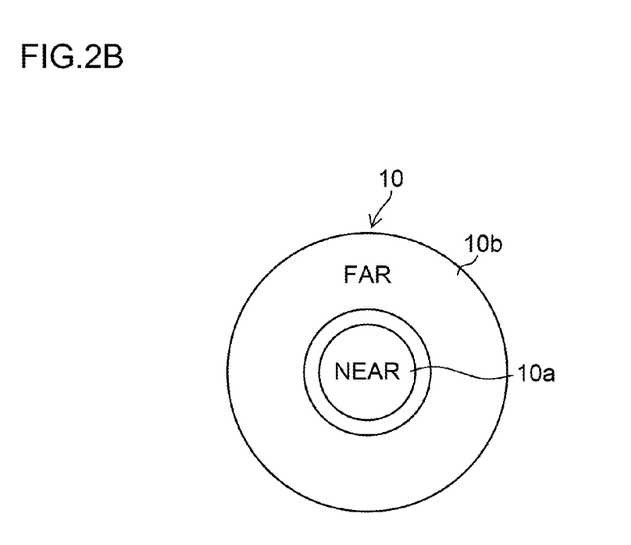
FIG. 2B is a front view of the taking lens depicted in FIG. 1.

The taking lens 10 of the present embodiment is a bifocal lens having a region 10a with a focal length for near photographing (for example, macro photography within several tens of cm) and a region 10b with a focal length for far photographing (for example, for a general distance from 1 m to infinity). The region 10a is formed in a circular shape centering on the optical axis of the taking lens 10, and the region 10b is formed in an annular shape. Also, between the region 10a and the region 10b, a light-shielding band is provided so as to prevent crosstalk between light beams subjected to pupil division, which will be described further below.

The image pickup device 16 has many light-receiving cells (light-receiving elements) two-dimensionally arranged, and a subject image formed on the light-receiving surface of each light-receiving cell is converted to signal voltage (or electrical charge) according to the incident light amount.

Figure 3:
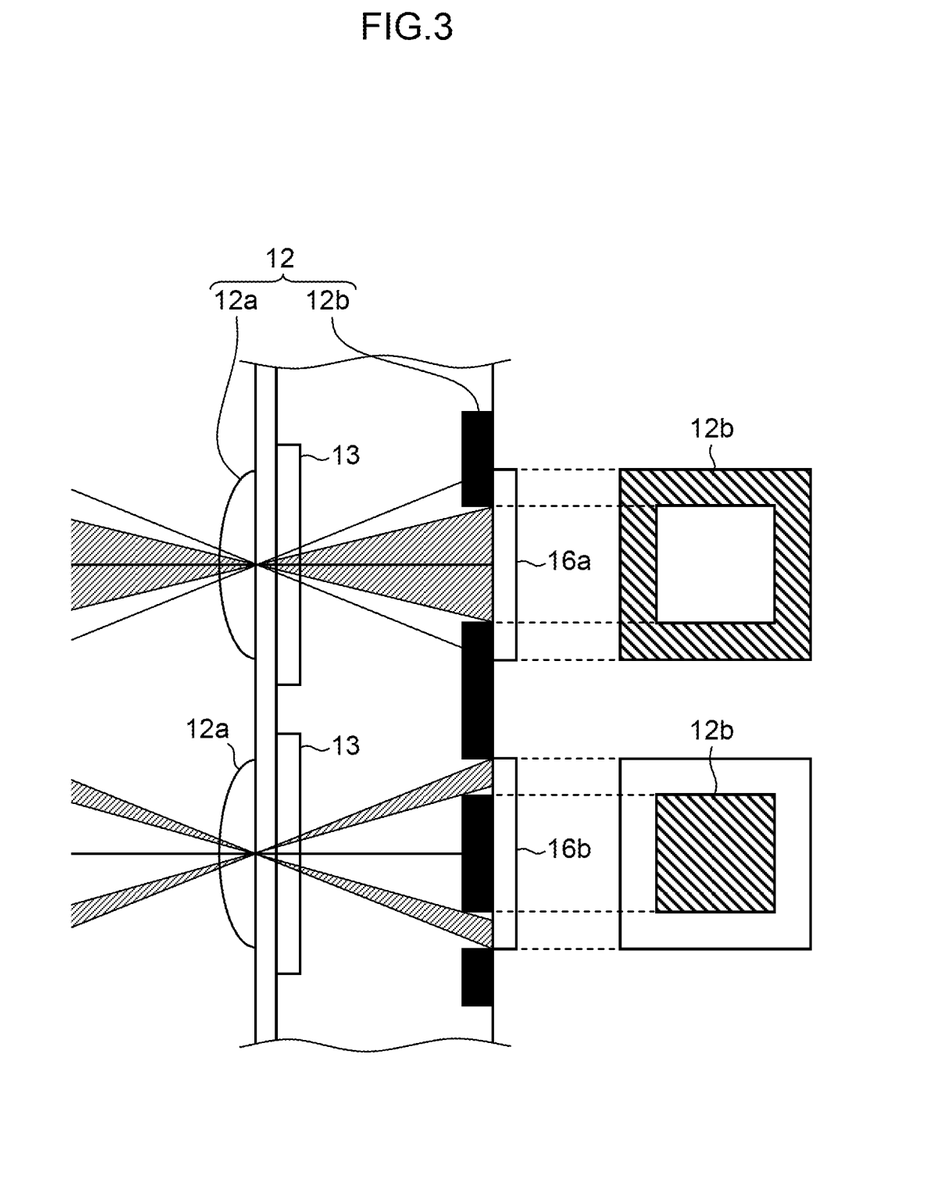
FIG. 3 is a sectional view of main parts of the image pickup device used for describing an example of an optical element for providing pupil directivity.

On a front surface of the image pickup device 16, an optical element 12 for providing pupil directivity is disposed as depicted in FIG. 3. This optical element 12 is configured of a microlens 12a for light gathering and image formation and a light-shielding member 12b regulating openings of the light-receiving cells 16a and 16b. Below each microlens 12a, a color filter 13 of red (R), green (G), and blue (B) is disposed.

The light-receiving cell 16a has its perimeter part of the opening light-shielded by the light-shielding member 12b. On the other hand, the light-receiving cell 16b has its center part of the opening light-shielded by the light-shielding member 12b. With this, a light beam passing through the region 10a in the center part of the taking lens 10 is subjected to pupil division by the microlens 12a and the light-shielding member 12b to enter the light-receiving cell 16a. On the other hand, a light beam passing through the region 10b in the peripheral part of the taking lens 10 is subjected to pupil division by the microlens 12a and the light-shielding member 12b to enter the light-receiving cell 16b.

The light-receiving cells 16a and the light-receiving cell 16b which receive light beams passing through two regions 10a and 10b, respectively, of the taking lens 10 are two-dimensionally arranged. A pixel group of the light-receiving cells 16a and a pixel group of the light-receiving cells 16b are arranged as being weighted, which will be described further below, and information obtainment capability according to the characteristics of the regions 10a and 10b of the taking lens 10 can be obtained.

Returning to FIG. 1, incident light is converted to electrical charge according to its light amount, and is accumulated in the light-receiving cells themselves or capacitors annexed thereto. The electrical charge accumulated in the image pickup device 16 is read as a voltage signal according to the charge amount by following a drive signal from a sensor control unit 32, and is retained together with information about the relevant pixel position. The voltage signal for each pixel is read by using, for example, a methodology of a MOS-type image pickup device (so-called CMOS sensor) using an X-Y address scheme, together with selection information about the pixel position of a read target.

With this, as depicted in FIG. 2A, an imaging signal corresponding to the pixel group of the light-receiving cells 16a and an imaging signal corresponding to the pixel group of the light-receiving cells 16b can be read separately from the image pickup device 16. For example, when a macro photography mode is set by operation at the operating unit 38, an imaging signal corresponding to the pixel group of the light-receiving cell 16a is read. In normal photographing mode other than the macro photography mode, an imaging signal corresponding to the pixel group of the light-receiving cells 16b is read.

The imaging signal (voltage signal) read from the image pickup device 16 is subjected to correlated double sampling (processing for reducing noise (in particular, thermal noise) and the like included in the output signal from the image pickup device; specifically, processing of obtaining accurate pixel data by taking a difference between a feed-through-component level (a signal during a zero-level period in which the signal level is at zero) included in the output signal for each pixel of the image pickup device 16 and a pixel signal component level). With this, R, G, and B signals for each pixel are sampled and held, amplified, and then added to an A/D converter 21. The A/D converter 21 converts sequentially inputted analog voltage signals (R, G, and B signals) to digital R, G, and B signals for output to an image input controller 22.

A digital signal processing unit 24 performs predetermined signal processing on the digital image signal inputted via the image input controller 22, the signal processing such as offset processing, gain control processing including white balance correction and sensitivity correction, gamma correction processing, YC processing (processing of converting R, G, and B color signals to luminance signals and color-difference signals).

An image processing unit 25 performs the following processing, but the processing performed by the image processing unit 25 is not indispensable.

As will be described further below, since the light-receiving cell 16a for macro photography is included at a ratio of one pixel to nine pixels (3×3 pixels) (refer to FIG. 4), data of a pixel where the light-receiving cell 16a for macro photography is present is lost from an image generated from image data read from the light-receiving cell 16b for a normal photographing distance. Therefore, regarding the lost pixel due to the presence of the light-receiving cell 16a, an interpolating process is performed based on the image data of the peripheral light-receiving cells 16b to perform a process of filling the lost pixel (self-interpolating process). Since the interpolating process is known, its description is omitted. Note that the number of rows for interpolation and weighting mode can be selected as appropriate.

Also, light beams passing through the region 10a of the taking lens 10 enter the light-receiving cell 16a of the image pickup device 16. With an error in accuracy of the optical element 12 for providing pupil directivity, cross talk may occurs between light beams subjected to pupil division, and a part of the light beams passing through the region 10b may enter. Similarly, light beams passing through the region 10b of the taking lens 10 enter the light-receiving cell 16b of the image pickup device 16, and a part of the light beams passing through the region 10a may enter. The image processing unit 25 performs image processing to correct image blurring and contrast deterioration due to the occurrence of crosstalk described above.

The image data processed in the digital signal processing unit 25 is inputted to a VRAM (Video Random Access Memory) 50. The image data read from the VRAM 50 is encoded by a video encoder 28, and is outputted to a liquid-crystal monitor 30 provided to a back surface of a camera. With this, a subject image is displayed on the display screen of the liquid-crystal monitor 30.

When a push at a first stage (a half push) of the shutter button of the operating unit 38 is provided, the CPU 40 starts an automatic focus adjustment (AF) operation, and the image data outputted from the A/D converter 21 is captured by an AE detecting unit 44.

The AE detecting unit 44 accumulates G signals on the entire screen or G signals weighted differently between a screen center portion and a peripheral portion, and outputs the accumulated value to the CPU 40. The CPU 40 calculates a brightness (a photographing Ev value) of the subject from the accumulated value inputted from the AE detecting unit 44. Based on the photographing Ev value, the CPU 40 determines a diaphragm value of the diaphragm and an electronic shutter (a shutter speed) of the image pickup device 16 by following a predetermined program diagram. The CPU 40 then controls the diaphragm based on the determined diaphragm value, and controls a charge accumulation time at the image pickup device 16 via the sensor control unit 32 based on the determined shutter speed.

When the AE operation ends and the shutter button is pushed at a second stage (a full push), image data outputted from the A/D converter 21 in response to the push is inputted from the image input controller 22 to a memory (SDRAM (Synchronous Dynamic Random Access Memory)) 48 for temporary storage. In the present embodiment, when a macro photography mode is set by an instruction of a photographer, image data corresponding to the pixel group of the light-receiving cells 16a is read. In normal photographing mode other than the macro photography mode, image data corresponding to pixel group of the light-receiving cells 16b is read. Note that the image data corresponding to the pixel group of the light-receiving cells 16a and the image data corresponding to pixel group of the light-receiving cells 16b may be simultaneously read.

The image data temporarily stored in the memory 48 is read by the digital signal processing unit 24 and the image processing unit 25 as appropriate, wherein predetermined signal processing including processing of generating luminance data and color-difference data of the image data (YC processing) is performed. The image data subjected to YC processing (YC data) is again stored in the memory 48.

The YC data stored in the memory 48 is outputted to a compression/decompression processing unit 26, is subjected to a predetermined compression process such as JPEG (joint photographic experts group), and is then recorded in the memory card 54 via a media controller 52. With this, a macro photography image or image for a general distance can be photographed and recorded.

Next, weighting arrangement of the light-receiving cells 16a and the light-receiving cells 16b in the image pickup device 16 is described.

[Number in Arrangement]

Figure 4:
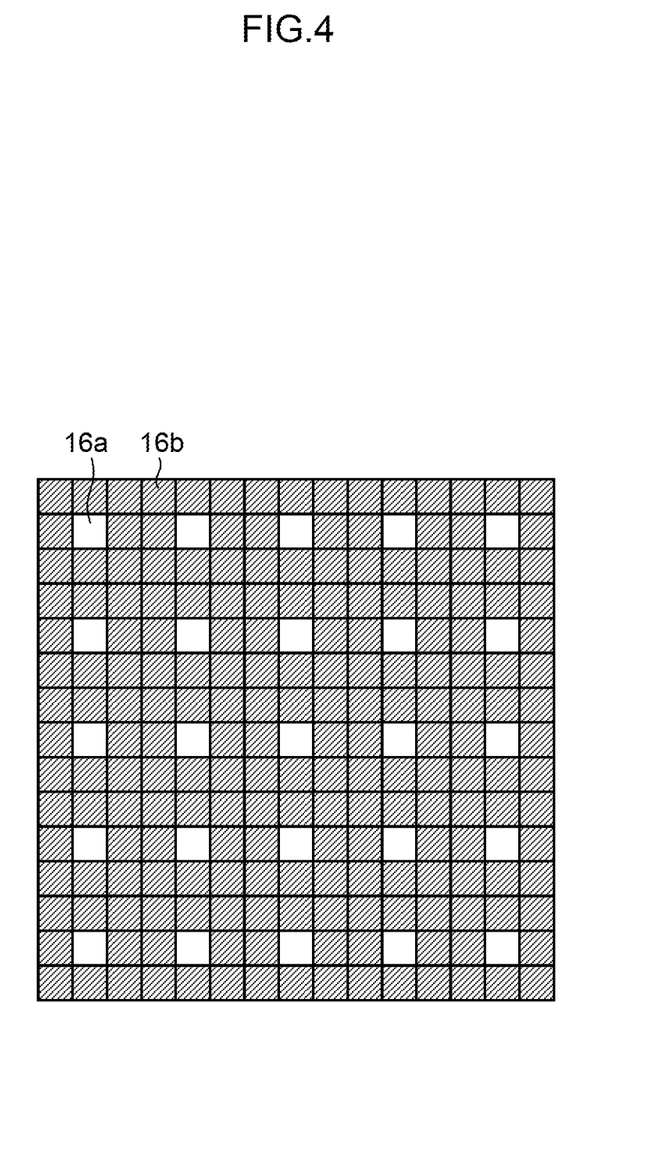
FIG. 4 is a diagram of an embodiment of weighting arrangement (a number in arrangement) regarding light-receiving cells of two types with different pupil directivities arranged in the image pickup device.

FIG. 4 is a diagram of an embodiment of weighting arrangement regarding the light-receiving cells 16a and the light-receiving cells 16b, schematically depicting part of the light-receiving surface of the image pickup device 16.

As depicted in FIG. 4, the image pickup device 16 is configured to have an arrangement pattern of 3×3 pixels repeatedly arranged in a horizontal direction and a vertical direction. As a pixel at the center of the 3×3 pixels, the light-receiving cell 16a is arranged. As eight pixels except the light-receiving cell 16a in the 3×3 pixels, the light-receiving cells 16b are arranged.

Therefore, the ratio of the light-receiving cells 16a for macro photography and the light-receiving cells 16b for a general distance in the number of pixels is 1:8, and these cells are evenly arranged in an entire region of the image pickup device 16.

In the present embodiment, a first reason why the number of light-receiving cells 16b for a general distance in arrangement is more than the number of light-receiving cells 16a for macro photography in arrangement is that the image for a general distance has a higher frequency of photographing and are often more likely to be regarded as important. Also, in a camera-equipped portable telephone having the imaging apparatus 1 mounted thereon, a scene in which a bar code (one-dimensional bar code or two-dimensional bar code (QR (Quick Response) code) is mainly read is assumed as an example of macro photography. From the above, a second reason why the number of light-receiving cells 16b for a general distance in arrangement is more than the number of light-receiving cells 16a for macro photography in arrangement is that the resolution can be any as long as the resolution allowing bar-code reading can be ensured and image quality such as that of general photographs is not required.

Figure 5A:
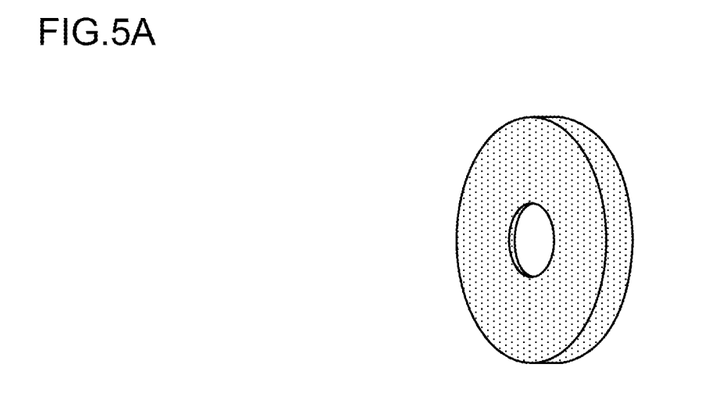
FIG. 5A is a diagram of a first example of a light-shielding member configuring light-receiving cells of three types with different pupil directivities arranged in the image pickup device.
Figure 5B:
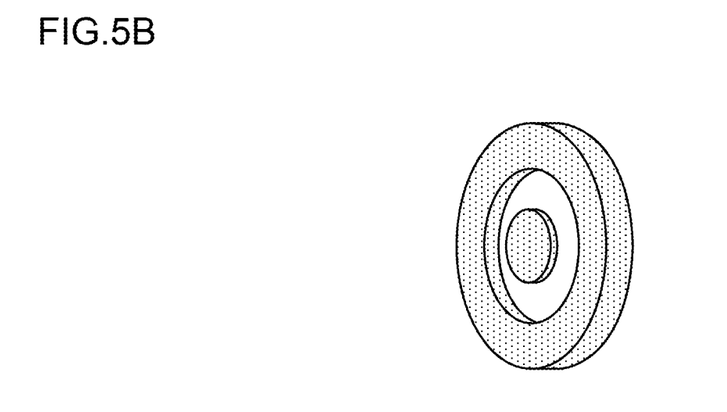
FIG. 5B is a diagram of a second example of the light-shielding member configuring light-receiving cells of three types with different pupil directivities arranged in the image pickup device.
Figure 5C:
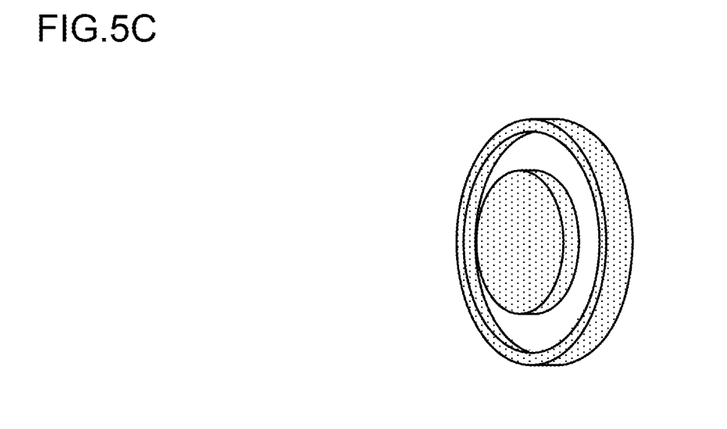
FIG. 5C is a diagram of a third example of the light-shielding member configuring light-receiving cells of three types with different pupil directivities arranged in the image pickup device.

Note that while the taking lens 10 of the present embodiment is a bifocal lens as depicted in FIG. 2, the presently disclosed subject matter is not restricted to this. For example, the taking lens 10 can be a trifocal lens having regions in a circular shape and a donut shape each with a focal length suitable for a general photographing distance, photographing distance for foods and products, and macro photographing distance, respectively. In this case, the light-receiving surface of each light-receiving cell of the image pickup device is light-shielded with any of light-shielding members as depicted in FIG. 5A to FIG. 5C. With this, it is possible to configure light-receiving cells of three types with different pupil directivities each receiving a light beam passing through the relevant region of the taking lens. Also, an example of a ratio of light-receiving cells of three types corresponding to a general photographing distance, photographing distance for foods and products, and macro photographing distance can be 4:4:1.

[Arrangement Density]

Figure 6:
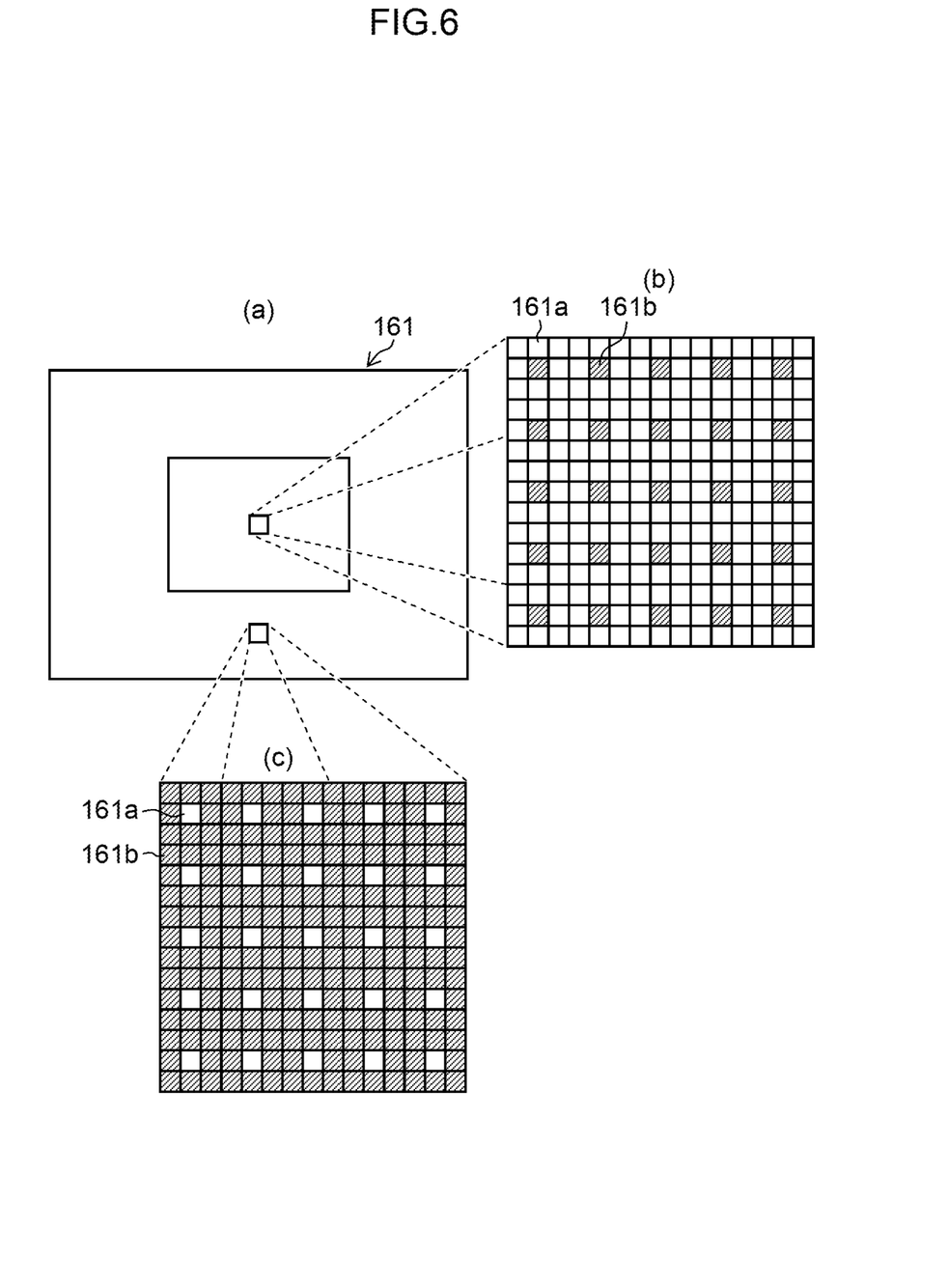
FIG. 6 is a diagram of an embodiment of weighting arrangement (arrangement density) regarding the light-receiving cells of two types with different pupil directivities arranged in the image pickup device.

FIG. 6 is a diagram schematically depicting a part of the light-receiving surface of an image pickup device 161, depicting an embodiment in which arrangement density regarding light-receiving cells 161a and light-receiving cells 161b are weighted.

As depicted in an (a) portion of FIG. 6, the light-receiving surface of the image pickup device 161 is sectioned into two regions, a center portion and a peripheral portion. In the center portion region of the image pickup device 161, the light-receiving cells 161a and the light-receiving cells 161b are arranged so that the density of the light-receiving cells 161a for macro photography is higher than the density of the light-receiving cells 161b for a general distance (a (b) portion of FIG. 6). On the other hand, in the peripheral portion region, the light-receiving cells 161a and the light-receiving cells 161b are arranged so that the density of the light-receiving cells 161a for macro photography is lower than the density of the light-receiving cells 161b for a general distance (a (c) portion of FIG. 6).

That is, the light-receiving cells are assigned so that the arrangement density of the light-receiving cells in the important region corresponding to the characteristic thereof is higher. Specifically, the arrangement densities of the light-receiving cells 161a and the light-receiving cells 161b differ between the center portion (near the optical axis) and the peripheral portion of the image pickup device 161, with the density of the light-receiving cells 161a for macro photography being higher in the center portion region and the density of the light-receiving cells 161b for a general distance being higher in the peripheral portion region.

Here, the reason why the arrangement density of the light-receiving cells 161a for macro photography is higher in the center portion region of the image pickup device 161 is that it is often the case in general macro photographing that a main subject is photographed as being positioned at a center portion of a photographing screen and it is preferable to increase the image quality (resolution) of this center portion.

Also, the light-receiving cells 161a for macro photography may be assigned at higher density only in the center portion region of the image pickup device 161 and only the light-receiving cells 161b for a general distance may be assigned to the peripheral portion region. For example, when bar code reading is performed in a camera-equipped portable telephone having the imaging apparatus 1 mounted thereon, a display frame for assistance may be displayed so that the bar code is displayed with a predetermined size on a liquid-crystal monitor so as to prompt for bar code photographing at an appropriate photographing distance. In this case, the light-receiving cells 161a for macro photography may be arranged only in a range of bar code photographing.

Figure 7:
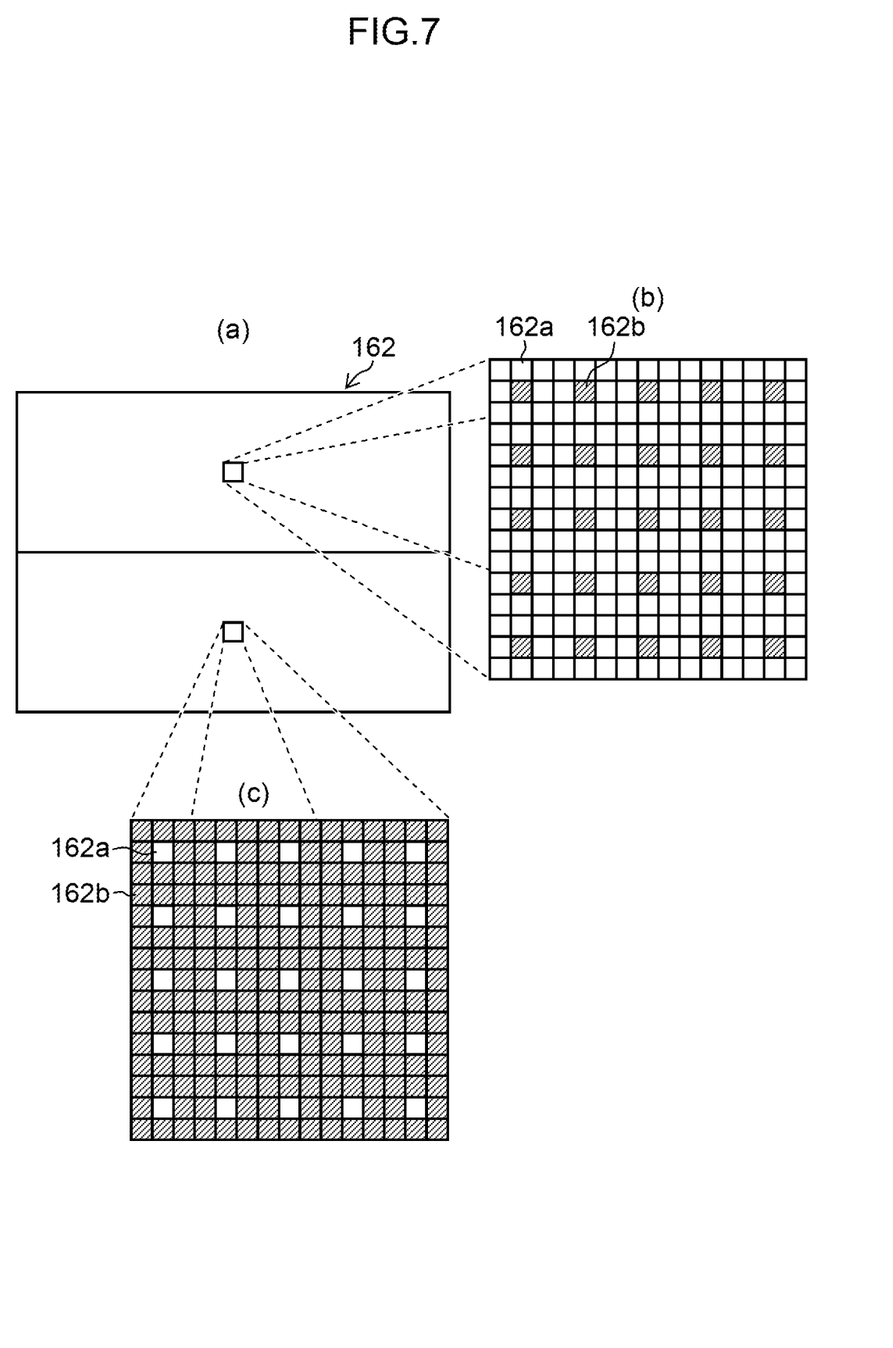
FIG. 7 is a diagram of another embodiment of weighting arrangement (arrangement density) regarding the light-receiving cells of two types with different pupil directivities arranged in the image pickup device.

FIG. 7 is a diagram schematically depicting a part of the light-receiving surface of an image pickup device 162, depicting another embodiment in which arrangement density regarding light-receiving cells 162a and light-receiving cells 162b are weighted.

As depicted in an (a) portion of FIG. 7, the light-receiving surface of the image pickup device 162 is sectioned into two regions, an upper portion and a lower portion. In the upper portion region, the light-receiving cells 162a and the light-receiving cells 162b are arranged so that the density of the near-distance light-receiving cells 162a for near subject distance is higher than the density of the far-distance light-receiving cells 162b for far subject distance (a (b) portion of FIG. 7). On the other hand, in the lower portion region, the light-receiving cells 162a and the light-receiving cells 162b are arranged so that the density of the far-distance light-receiving cells 162b is higher than the density of the near-distance light-receiving cells 162b (a (c) portion of FIG. 7).

Note that the taking lens (not depicted in the drawings) preferably has a region with a focal distance at which a near-distance subject is in focus and a region with a focal distance at which a far-distance subject is in focus, these regions being formed in an upper region and a lower region, respectively, obtained by dividing the taking lens. The near-distance light-receiving cells 162a and the far-distance light-receiving cells 162b of the image pickup device 162 are assumed to receive light beams passing through the near-distance region and light beams passing through the far-distance region, respectively, of the taking lens.

As depicted in FIG. 7, the reason why the arrangement density of the near-distance light-receiving cells 162a is higher in the upper portion region of the image pickup device 162 and the arrangement density of the far-distance light-receiving cells 162 b is higher in the lower portion region is that it is often the case that a near-distance subject is present on a lower portion of a photographing screen (an upper portion of the image pickup device) and, on the other hand, a far-distance subject is present on an upper portion of the photographing screen (a lower portion of the image pickup device).

[Aperture Size]

Figure 8:
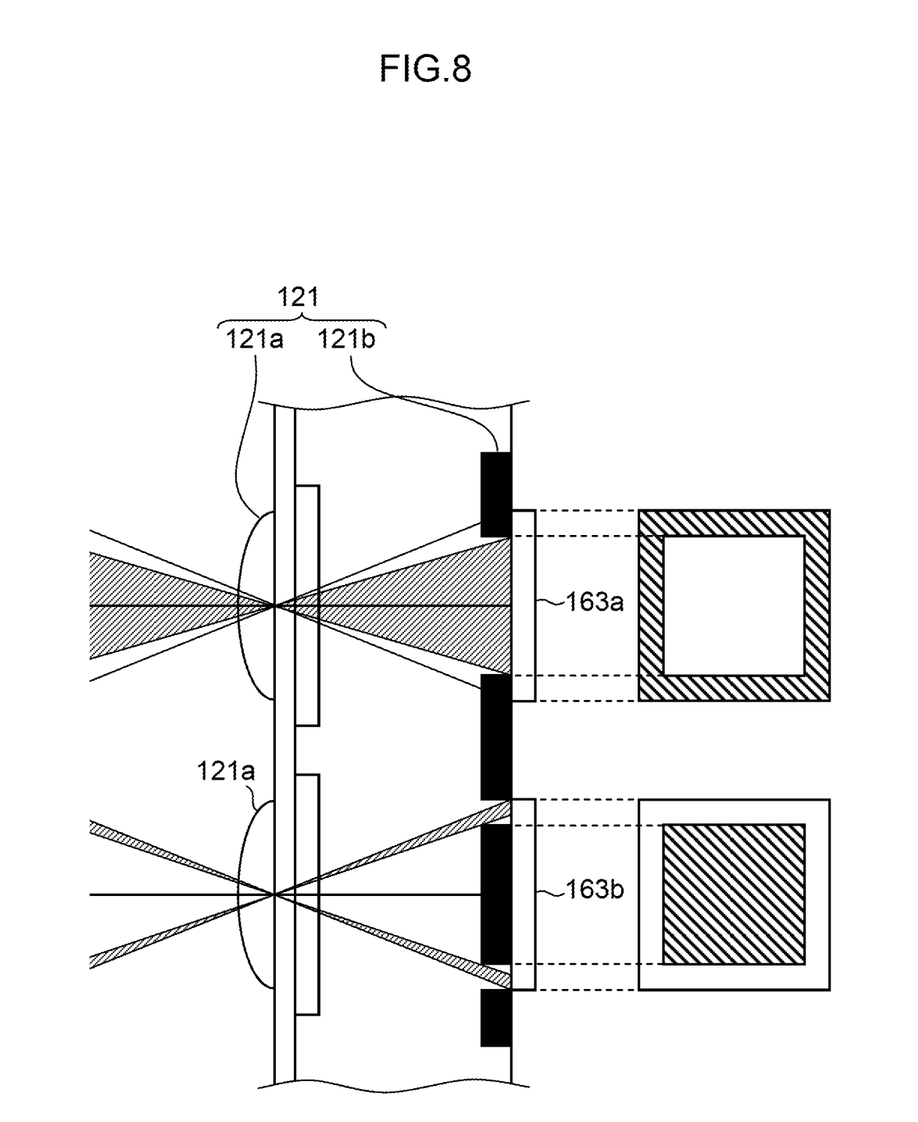
FIG. 8 is a diagram of an embodiment in which photographing sensitivity (aperture size) regarding the light-receiving cells of two types with different pupil directivities arranged in the image pickup device is weighted.

FIG. 8 is a diagram of main parts of an optical element 121 and an image pickup device 163 for providing directivities The optical element 121 is configured of a microlens 121a for light gathering and image formation and a light-receiving member 121b regulating apertures of the light-receiving cells 163a and 163b. Note that the light-receiving cells 163a and 163b receiving light beams passing through two regions 10a and 10b of the taking lens 10 (refer to FIG. 2) are two-dimensionally arranged, respectively.

The light-receiving cell 163a has a peripheral portion of the aperture light-shielded with the light-shielding member 121b. On the other hand, the light-receiving cell 163b has a center portion of the aperture light-shielded with the light-shielding member 121b. With this, a light beam passing through the center portion region 10a of the taking lens 10 is subjected to pupil division by the microlens 121a and the light-shielding member 121b and enters the light-receiving cell 163a. On the other hand, a light beam passing through the peripheral portion region 10b of the taking lens 10 is subjected to pupil division by the microlens 121a and the light-shielding member 121b and enters the light-receiving cell 163b.

As depicted in FIG. 8, the light-receiving cell 163a and the light-receiving cell 163b are different from each other in position and area to be light-shielded with the light-shielding member 121b. The aperture size of the light-receiving cell 163a is larger than the aperture size of the light-receiving cell 163b.

With this, when the same light amount enters the light-receiving cells 163a and 163b via the microlens 121a, the light-receiving cell 163a can receive more light amount than the light-receiving cell 163b, and therefore has high photographing sensitivity.

An image that can be obtained from the pixel group of the light-receiving cells 163a can have higher photographing sensitivity, and an image that can be obtained from the pixel group of the light-receiving cells 163b can have normal photographing sensitivity.

And, a light beam passing through the macro photography region 10a of the taking lens 10 enters the light-receiving cell 163a via the optical element 121, and a light beam passing through the region 10b for a general distance enters the light-receiving cell 163b via the optical element 121. With this, the close-up photographed image that can be obtained from the pixel group of the light-receiving cells 163a has higher photographing sensitivity, and the image for a general distance that can be obtained from the pixel group of the light-receiving cells 163b normal photographing sensitivity.

As such, by assigning the light-receiving cells 163a and the light-receiving cells 163b with different aperture sizes according to different characteristics of the taking lens 10, an image with photographing sensitivity suitable for the characteristic can be obtained.

In the present embodiment, the light-receiving cells 163a of a larger aperture size are assigned to a characteristic requiring larger light amount. As such, with a large aperture size of the light-receiving cell 163a corresponding to the characteristic of the lens for macro photography, for example, a bright image can be obtained even the subject appears dark hidden in the shadow of the imaging apparatus in macro photography.

Figure 9:
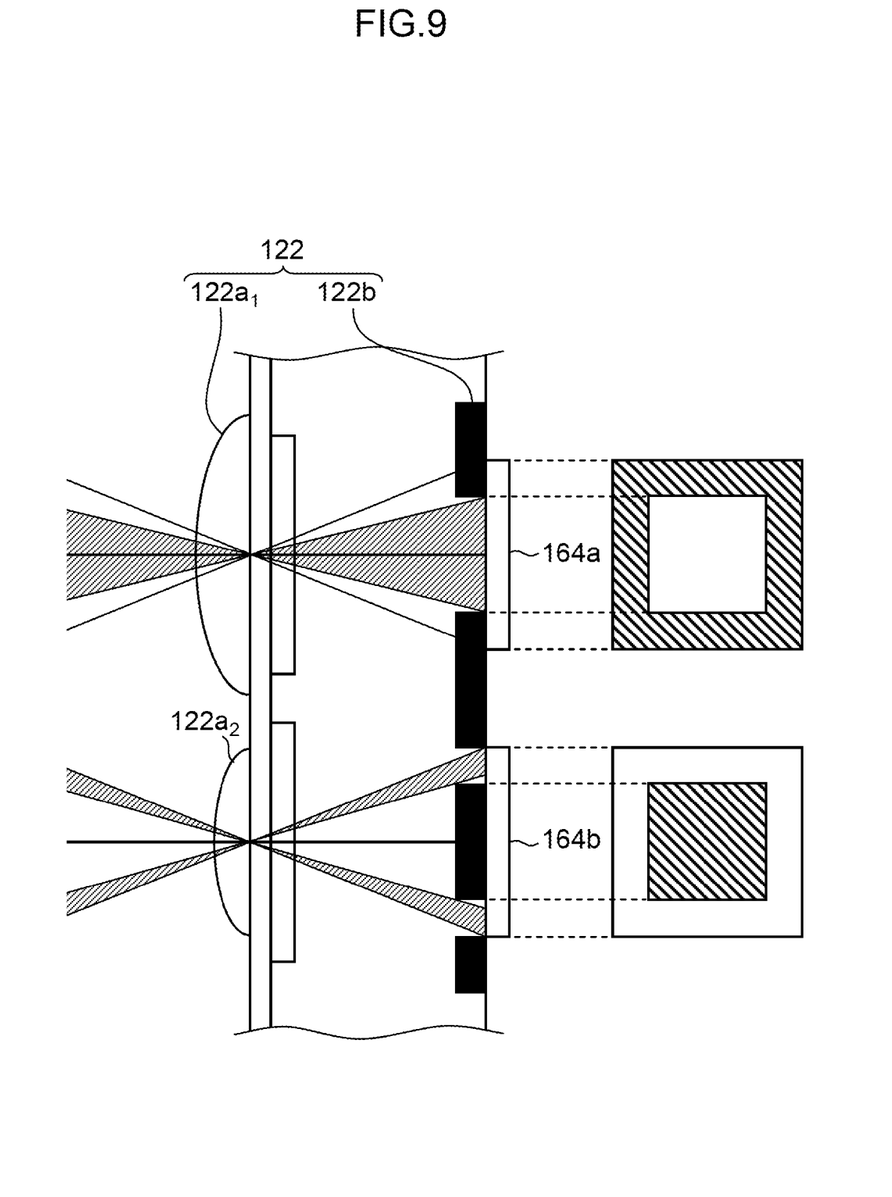
FIG. 9 is a diagram of an embodiment in which photographing sensitivity (size of a microlens) regarding the light-receiving cells of two types with different pupil directivities arranged in the image pickup device is weighted.

FIG. 9 is a sectional view of main parts of an optical element 122 and an image pickup device 164 for providing pupil directivities.

The optical element 122 is configured of microlenses $122a_1$ and $122a_2$ for light gathering and image formation and a light-receiving member 122b regulating apertures of light-receiving cells 164a and 164b. Note that the light-receiving cells 164a and 164b receiving light beams passing through two regions 10a and 10b of the taking lens 10 (refer to FIG. 2) are two-dimensionally arranged, respectively.

The light-receiving cell 164a has a peripheral portion of the aperture light-shielded with the light-shielding member 122b. On the other hand, the light-receiving cell 164b has a center portion of the aperture light-shielded with the light-shielding member 122b. With this, a light beam passing through the center portion region 10a of the taking lens 10 is subjected to pupil division by the microlens $122a_1$ and the light-shielding member 122b and enters the light-receiving cell 164a. On the other hand, a light beam passing through the peripheral portion region 10b of the taking lens 10 is subjected to pupil division by the microlens $121a_2$ and the light-shielding member 122b and enters the light-receiving cell 164b.

Here, the microlens $122a_1$ and the microlens $122a_2$ are different from each other in lens size (lens diameter), the microlens $122a_1$ capable of gathering larger light amount than the microlens $122a_2$ and letting the light enter the light-receiving cells 164a. With this, as with the embodiment depicted in FIG. 8, images of different photographing sensitivities can be obtained.

[Others]

While a multifocal lens having different focal length regions is used as the taking lens in the present embodiment, the taking lens is not restricted to this mode. For example, a various characteristic lens can be used such as a lens having a plurality of regions with different transmission wavelength regions or a lens having a plurality of various regions with different colors.

For example, a taking lens (a photographing optical system formed of a taking lens and a filter) having an infrared-cut region and a visible-light-cut region is used, and light-receiving cells having RGB color filters and light-receiving cells without color filters are two-dimensionally arranged in the image pickup device. Light beams passing through the infrared-cut region by an optical element for providing pupil directivity are let enter the light-receiving cells having the color filters, and light beams passing through the visible-cut region are let enter the light-receiving cells without color filters. According to this, a normal color image and an infrared image can be photographed.

In this case, the number of light-receiving cells in arrangement corresponding to the normal color image is set more than the number of light-receiving cells in arrangement corresponding to the infrared image. This is because, in general, the infrared image has lower image quality (resolution) compared with the normal color image. Also, the aperture size of the light-receiving cell corresponding to the infrared image is set larger than the aperture size of the light-receiving cell corresponding to the color image. This is because it is often the case that the infrared image is used under a darker photographing condition.

Figure 10A:
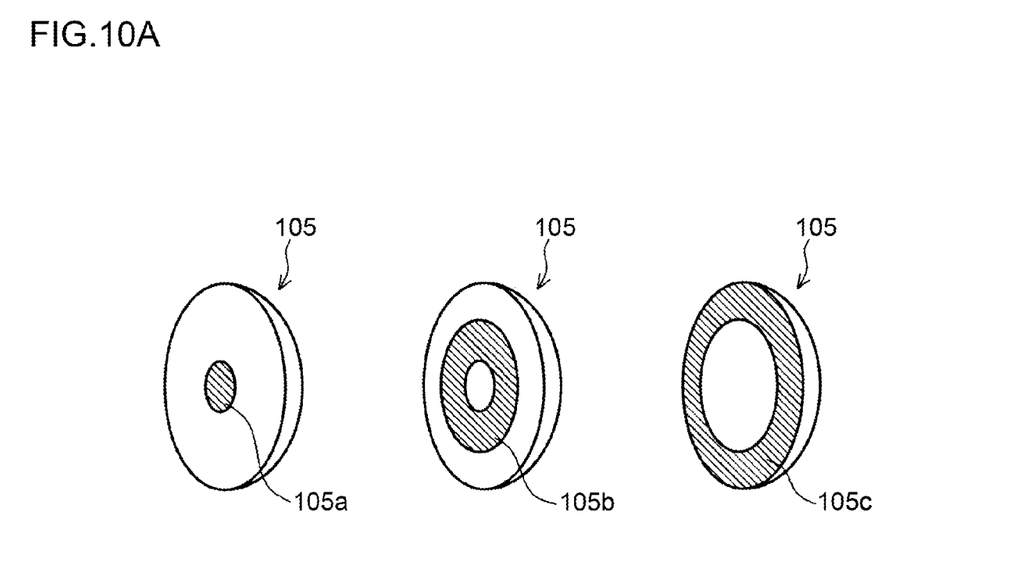
FIG. 10A is a diagram of an example of a taking lens with a different spatial frequency characteristic for each region of the taking lens.
Figure 10B:
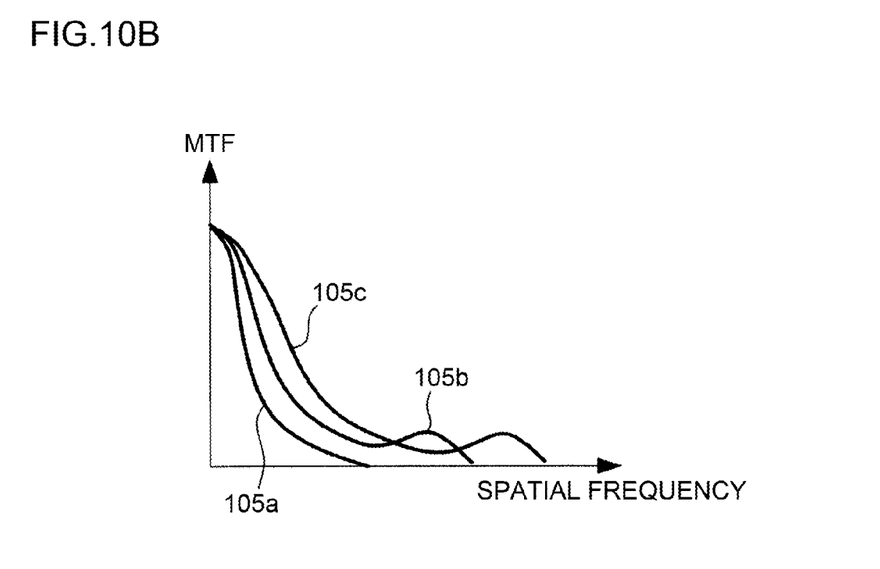
FIG. 10B is a graph representing a relation between the spatial frequency and MTF characteristics in the taking lens with a different spatial frequency characteristic for each region of the taking lens.

Furthermore, as another example of the taking lens, a taking lens 105 with different spatial frequency characteristics according to regions 105a, 105b, and 105c as depicted in FIGS. 10A-10B. In this case, the ratio of the number of light-receiving cells in arrangement corresponding to a region with higher lens capability (for example, a region with higher MTF (Modulation Transfer Function)) is preferably higher than the ratio of the number of light-receiving cells in arrangement corresponding to a region with lower lens capability.

Still further, two or more of the number of light-receiving cells in arrangement, arrangement density, and aperture size (photographing sensitivity) corresponding to each region of the taking lens with different characteristics may be combined as appropriate to weight the characteristics.

Yet still further, the optical element for providing pupil directivity is not restricted to the one obtained by combining the microlens(es) and the light-shielding member in the present embodiment. For example, the one using a micro split prism (Japanese Patent Application Laid-Open No. 2002-191060), the one using a pupil-division polarizing element (Japanese Patent Application Laid-Open No. 2009-162847), or the like can be applied.

Note that while description has been made in the present embodiment with the example in which a CMOS is used as an image pickup device, the image pickup device is not restricted to a CMOS. The presently disclosed subject matter can be applied also to another image sensor such as a CCD (Charge Coupled Device).

Also, it goes without saying that the presently disclosed subject matter is not restricted to the embodiments described above and various modifications can be made in a range not deviating from the spirit of the presently disclosed subject matter.

What is claimed is:

1. An imaging apparatus comprising:
   a photographing optical system having a first region with a first characteristic and a second region with a second characteristic different from the first characteristic;
   an image pickup device having a first light-receiving element group and a second light-receiving element group which are two-dimensionally arranged;
   optical elements provided correspondingly to the first light-receiving element group and the second light-receiving element group of the image pickup device, and letting only a light beam passing through the first region of the photographing optical system received by the first light-receiving element group and letting only a light beam passing through the second region of the photographing optical system received by the second light-receiving element group; and
   an image generating unit configured to obtain a first imaging signal or a second imaging signal from the first light-receiving element group or the second light-receiving element group of the image pickup device, respectively, and configured to generate a first image or a second image, respectively,
   wherein the first light-receiving element group and the second light-receiving element group of the image pickup device are configured to obtain the first image and the second image with different weights according to the first characteristic and the second characteristic, respectively, of the photographing optical system.

2. The imaging apparatus according to claim 1, wherein the first region and the second region of the photographing optical system are different from each other in at least one of a focal length, a transmission wavelength band, and a spatial frequency characteristic.

3. The imaging apparatus according to claim 2, wherein in the first light-receiving element group and the second light-receiving element group of the image pickup device, more light-receiving elements arranged correspondingly to a characteristic regarded as important between the first characteristic and the second characteristic of the photographing optical system are assigned than other light-receiving elements.

4. The imaging apparatus according to claim 2, wherein the first light-receiving element group and the second light-receiving element group of the image pickup device are configured so that an arrangement density of the first light-receiving element group and an arrangement density of the second light-receiving element group vary according to a position the image pickup device.

5. The imaging apparatus according to claim 2, wherein the first light-receiving element group and the second light-receiving element group of the image pickup device are configured to have different photographing sensitivities.

6. The imaging apparatus according to claim 1, wherein in the first light-receiving element group and the second light-receiving element group of the image pickup device, more light-receiving elements arranged correspondingly to a characteristic regarded as important between the first characteristic and the second characteristic of the photographing optical system are assigned than other light-receiving elements.

7. The imaging apparatus according to claim 6, wherein the photographing optical system has the first characteristic for a general photographing distance and the second characteristic for macro photography, and a number of pixels of the first light-receiving element group of the image pickup device is larger than a number of pixels of the second light-receiving element group.

8. The imaging apparatus according to claim 1, wherein the first light-receiving element group and the second light-receiving element group of the image pickup device are configured so that an arrangement density of the first light-receiving element group and an arrangement density of the second light-receiving element group vary according to a position the image pickup device.

9. The imaging apparatus according to claim 8, wherein the photographing optical system has the first region which is in a circular shape centering on an optical axis of the photographing optical system and the second region which is in an annular shape, the first region with the first characteristic being for a general photographing distance and the second region with the second characteristic being for macro photography, and the arrangement density of the first light-receiving element group of the image pickup device is higher in a peripheral portion than in a center portion of the image pickup device, and the arrangement density of the second light-receiving element group is higher in the center portion than the peripheral portion of the image pickup device.

10. The imaging apparatus according to claim 8,
wherein the photographing optical system has the first characteristic in which a focus is achieved on a far view and the second characteristic in which the focus is achieved on a near view, and the first light-receiving element group of the image pickup device has a density higher in a lower region than in a higher region of the image pickup device, and the second light-receiving element group of the image pickup device has a density higher in the higher region than in the lower region of the image pickup device.

11. The imaging apparatus according to claim 1,
wherein the first light-receiving element group and the second light-receiving element group of the image pickup device are configured to have different photographing sensitivities.

12. The imaging apparatus according to claim 11,
wherein the photographing optical system has the first region with the first characteristic for a general photographing distance and the second characteristic for macro photography, and the photographing sensitivity of the second light-receiving element group of the image pickup device is higher than the photographing sensitivity of the second light-receiving element group.

13. The imaging apparatus according to claim 11,
wherein the first light-receiving element group and the second light-receiving element group of the image pickup device are configured to have different sizes of an aperture which light enters or different sizes of a microlens for letting light gathered to each light-receiving element.

14. The imaging apparatus according to claim 13,
wherein the photographing optical system has the first region with the first characteristic for a general photographing distance and the second characteristic for macro photography, and the photographing sensitivity of the second light-receiving element group of the image pickup device is higher than the photographing sensitivity of the second light-receiving element group.

* * * * *